(12) United States Patent
Odanaka (10) Patent No.: US 10,955,290 B2
(45) Date of Patent: Mar. 23, 2021

(54) LASER PROCESSING APPARATUS AND OUTPUT POWER CHECKING METHOD

(71) Applicant: DISCO CORPORATION, Tokyo (JP)

(72) Inventor: Kentaro Odanaka, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 267 days.

(21) Appl. No.: 16/145,725

(22) Filed: Sep. 28, 2018

(65) Prior Publication Data

US 2019/0101443 A1    Apr. 4, 2019

(30) Foreign Application Priority Data

Oct. 3, 2017    (JP) .............................. JP2017-193393

(51) Int. Cl.
| | | |
|---|---|---|
| *G01J 1/42* | (2006.01) | |
| *G02B 19/00* | (2006.01) | |
| *G01J 1/04* | (2006.01) | |
| *B23K 26/06* | (2014.01) | |
| *G02B 27/28* | (2006.01) | |
| *G01J 1/02* | (2006.01) | |

(52) U.S. Cl.
CPC ........ *G01J 1/4257* (2013.01); *B23K 26/0626* (2013.01); *G01J 1/0238* (2013.01); *G01J 1/0411* (2013.01); *G01J 1/0437* (2013.01); *G02B 19/0009* (2013.01); *G02B 19/0047* (2013.01); *G02B 27/283* (2013.01); *G01J 2001/4261* (2013.01)

(58) Field of Classification Search
CPC ............ B23K 2101/40; B23K 2103/56; B23K 26/032; B23K 26/048; B23K 26/0626; B23K 26/0676; B23K 26/0823; B23K 26/0853; B23K 26/0869; B23K 26/704; B23K 26/705; G01J 1/0238; G01J 1/0411; G01J 1/0437; G01J 1/4257; G01J 2001/4261; G02B 19/0009; G02B 19/0047; G02B 26/02; G02B 27/283
USPC .................................................... 219/121.62
See application file for complete search history.

(56) References Cited

U.S. PATENT DOCUMENTS

2012/0176628 A1*    7/2012    Agawa ................. G01B 11/002
                                                                     356/601

FOREIGN PATENT DOCUMENTS

| JP | 2015167969 | * | 9/2015 |
|---|---|---|---|
| JP | 2015167969 A | | 9/2015 |

* cited by examiner

*Primary Examiner* — Dana Ross
*Assistant Examiner* — Joseph W Iskra
(74) *Attorney, Agent, or Firm* — Greer, Burns & Crain, Ltd.

(57) ABSTRACT

A laser processing apparatus includes a branching unit configured to branch a laser beam to a first optical path and a second optical path, a condenser configured to condense the branched laser beams on a processing face of a workpiece, an output power measuring unit configured to measure the output power of the laser beam emitted from a laser beam generation unit and having passed through the condenser, and a blocking member positioning mechanism disposed between the condenser and the output power measuring unit and capable of positioning a blocking member between a first laser beam blocking position at which the blocking member blocks only the laser beam of the first optical path from between the branched laser beams and a retracted position at which the blocking member blocks none of the laser beams.

8 Claims, 4 Drawing Sheets

LASER PROCESSING APPARATUS AND OUTPUT POWER CHECKING METHOD

BACKGROUND OF THE INVENTION

Field of the Invention

The present invention relates to a laser processing apparatus in which a laser beam emitted from a laser beam generation unit is branched to a plurality of optical paths and irradiated upon a workpiece and a method for checking output power of each of branched laser beams.

Description of the Related Art

A laser processing apparatus is known in which a laser beam emitted from a laser beam generation unit is branched to two optical paths by a polarizer and a polarizing beam splitter or the like so as to be able to be simultaneously irradiated upon two locations of a processing face of a workpiece (for example, refer to Japanese Patent Laid-Open No. 2015-167969). A laser processing apparatus of the type described can improve the productivity because, for example, two laser processed grooves of same quality can be formed simultaneously on a workpiece.

SUMMARY OF THE INVENTION

However, in the conventional laser processing apparatus described above, the output power balance of branched laser beams is sometimes impaired by deviation of a rotational angle of the polarizer or the like arising from deterioration of a part. If laser processing is applied to a workpiece in a state in which the output power balance is impaired, then since the processing quality differs between the laser beams, there is a problem that some dispersion occurs with the depth or the like of laser processed grooves.

For example, the conventional laser processing apparatus has a problem that, in the case where, after laser beams are irradiated upon a low-k film formed in streets of a workpiece to form two laser processed grooves in which the low-k film at the opposite ends in the widthwise direction of the streets is removed, the streets from the opposite ends of which the low-k film is removed are cut by cutting blades, if the depth of the laser processed grooves is varied such that one of the laser processed grooves is formed shallower than a predetermined depth, then upon a later cutting process, the blades meander or exfoliation of the low-k film that has not been broken up by the laser beam of a greater diameter occurs.

Therefore, it is an object of the present invention to provide an output power checking method by which the output power of each of laser beams branched to a plurality of optical paths can be checked and a laser processing apparatus.

In accordance with an aspect of the present invention, there is provided a laser processing apparatus including a holding table configured to hold a workpiece thereon, a laser beam generation unit configured to generate a laser beam to be irradiated upon the workpiece held on the holding table, a branching unit configured to branch the laser beam emitted from the laser beam generation unit at least to a first optical path and a second optical path, a condenser configured to condense the laser beams branched by the branching unit on a processing face of the workpiece, an output power measuring unit configured to measure output power of the laser beam emitted from the laser beam generation unit and having passed through the condenser, and blocking member positioning means disposed between the condenser and the output power measuring unit and capable of positioning a blocking member between a first laser beam blocking position at which the blocking member blocks only the laser beam of the first optical path from between the laser beams branched by the branching unit and a retracted position at which the blocking member blocks none of the laser beams, the branching unit including an adjustment unit configured to adjust output power balance between the laser beams branched at least to the first optical path and the second optical path.

Preferably, the laser processing apparatus may further include an image pickup unit configured to pick up an image of the blocking member, and control unit configured to control at least the laser beam generation unit and the blocking member positioning means. The control unit controls the blocking member positioning means based on a position of the blocking member detected based on the picked up image of the blocking member picked up by the image pickup unit.

Preferably, the image pickup unit may pick up an image of the workpiece held on the holding table.

In accordance with another aspect of the present invention, there is provided an output power checking method for checking, in a laser processing apparatus in which a laser beam emitted from a laser beam generation unit is branched at least to a first optical path and a second optical path by a branching unit and the branched laser beams are condensed to and irradiated upon a processing face of a workpiece held on a holding table by a condenser, output power of the branched laser beams, the output power checking method including a total output power measurement step of measuring total output power of the laser beams at least of the first optical path and the second optical path emitted from the laser beam generation unit and condensed by the condenser, a blocking step of blocking at least the laser beam of the first optical path emitted from the laser beam generation unit and condensed by the condenser using a blocking member, a non-blocked laser beam output power measurement step of measuring output power of the laser beam, which is not blocked by the blocking member, in a state in which the blocking step is carried out, and a laser beam output power calculation step of calculating, based on the value measured at the total output power measurement step and the value measured at the non-blocked laser beam output power measurement step, first output power of the laser beam branched to the first optical path and second output power of the laser beam branched to the second optical path.

With the laser processing apparatus of the present invention, by positioning the blocking member at the first laser beam blocking position at which the blocking member blocks only the laser beam of the first optical path from between the laser beams branched to the first optical path and the second optical path, the laser beam of the second optical path can be irradiated upon the output power measuring unit to measure the output power of the laser beam of the second optical path. Further, by positioning the blocking member at the retracted position at which the blocking member blocks none of the laser beams, all laser beams can be irradiated upon the output power measuring unit to measure the output power of all laser beams. Therefore, the output power of the laser beams branched to the plurality of optical paths can be checked on the basis of the measurement values.

Further, where a control unit is configured such that it controls the blocking member positioning means on the basis of the position of the blocking member detected on the basis of the picked up image of the blocking member picked up by an image pickup unit, the blocking member can be positioned in a shorter period of time at the first laser beam blocking position at which the blocking member blocks only the laser beam of the first optical path.

With the output power checking method of the present invention, at the total output power measurement step, the total power of the laser beams branched to the first optical path and the second optical path is measured, and at the non-blocked laser beam output power measurement step, the output power of the laser beam that is not blocked by the blocking member in the state in which only the laser beam of the first optical path is blocked by the blocking member is measured. Then, at the laser beam output power calculation step, on the basis of the value measured at the total output power measurement step and the value measured at the non-blocked laser beam output power measurement step, the output power of the laser beam branched to the first optical path and the output power of the laser beam branched to the second optical path are calculated. Therefore, the output power of the laser beams branched to the plurality of optical paths can be checked.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
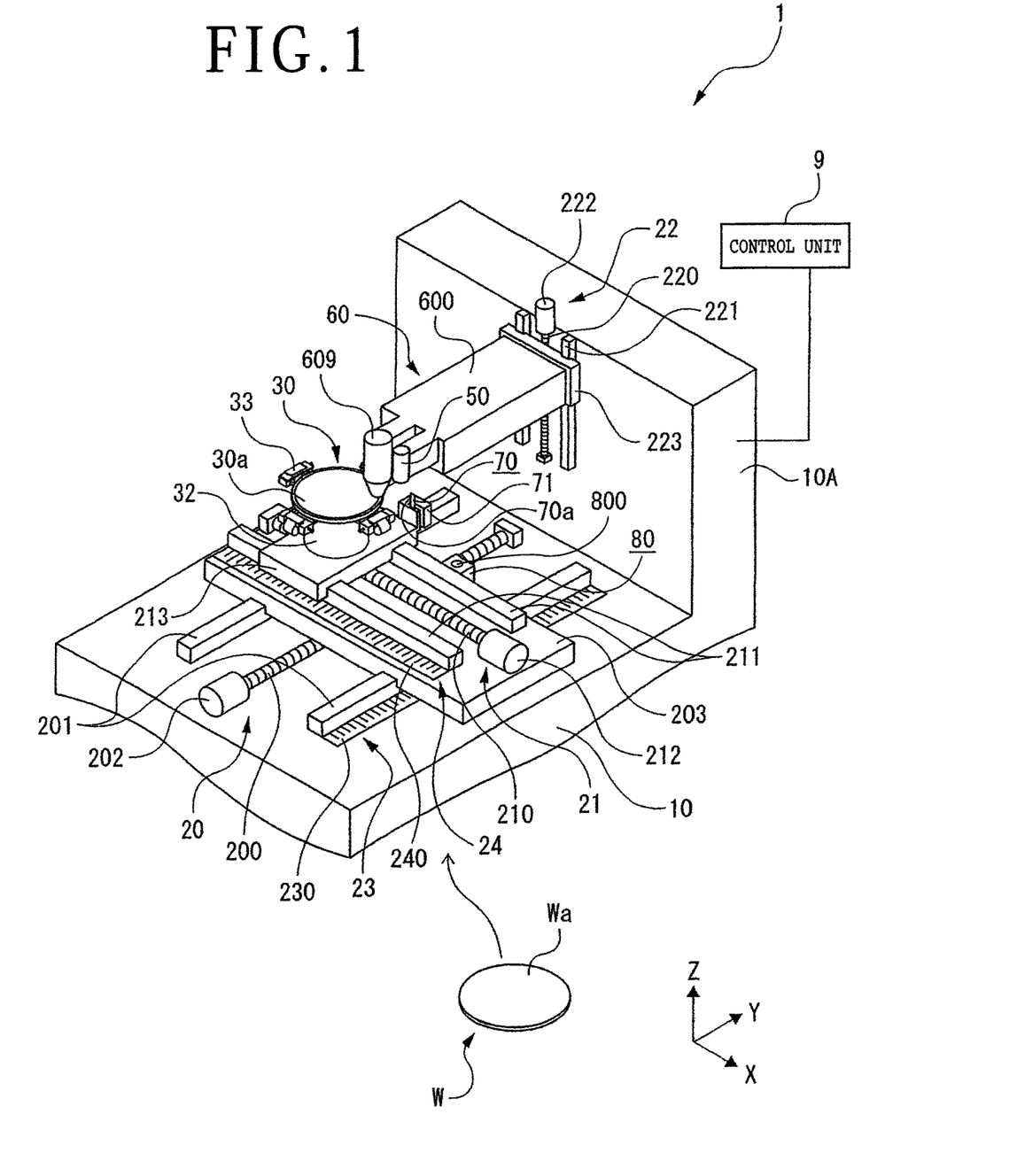
FIG. 1 is a perspective view depicting an example of a laser processing apparatus.

A laser processing apparatus 1 depicted in FIG. 1 is a processing apparatus that irradiates a laser beam upon a workpiece W held on a holding table 30 to process the workpiece W. On a base 10 of the laser processing apparatus 1, a Y-axis moving unit 20 is provided which moves the holding table 30 back and forth in a Y-axis direction that is an indexing feeding direction. The Y-axis moving unit 20 is configured from a ball screw 200 having an axis in the Y-axis direction, a pair of guide rails 201 disposed in parallel to the ball screw 200, a pulse motor 202 for rotating the ball screw 200, and a movable plate 203 that meshes at a nut provided therein with the ball screw 200 and slidably contacts at a bottom portion thereof with the guide rails 201. If the pulse motor 202 rotates the ball screw 200, then the movable plate 203 is moved by the ball screw 200 in the Y-axis direction under the guidance of the guide rails 201, and the holding table 30 disposed on the movable plate 203 with a X-axis moving unit 21 interposed therebetween is moved in the Y-axis direction by the movement of the movable plate 203.

On the movable plate 203, the X-axis moving unit 21 is provided which moves the holding table 30 back and forth in an X-axis direction that is a processing feeding direction. The X-axis moving unit 21 includes a ball screw 210 having an axis in the X-axis direction, a pair of guide rails 211 disposed in parallel to the ball screw 210, a pulse motor 212 for rotating the ball screw 210, and a movable plate 213 that meshes at a nut provided therein with the ball screw 210 and slidably contacts at a bottom portion thereof with the guide rails 211. If the pulse motor 212 rotates the ball screw 210, then the movable plate 213 is moved by the ball screw 210 in the X-axis direction under the guidance of the guide rails 211, and the holding table 30 disposed on the movable plate 213 is moved in the X-axis direction by the movement of the movable plate 213.

The holding table 30 for holding the workpiece W has a circular outer shape and is communicated with a suction source not depicted such that it sucks and holds the workpiece W on a holding face 30a thereof that is a horizontal face. The holding table 30 is rotatable around an axis in the vertical direction (Z-axis direction) by rotation means 32 disposed on the bottom face side thereof. Around the holding table 30, four fixing clamps 33 for fixing, when the workpiece W is supported on an annular frame of the holding table 30, the annular frame are disposed uniformly in a circumferential direction.

On the rear (+Y direction side) of the base 10, a column 10A is provided uprightly, and a laser beam generation unit 60 is disposed on a front face of the column 10A with a Z-axis moving unit 22 interposed therebetween. The Z-axis moving unit 22 is configured from a ball screw 220 having an axis in the Z-axis direction, a pair of guide rails 221 disposed in parallel to the ball screw 220, a pulse motor 222 for rotating the ball screw 220, and a movable plate 223 that meshes at a nut provided therein with the ball screw 220 and contacts at a side portion thereof with the guide rails 221. If the pulse motor 222 rotates the ball screw 220, then the movable plate 223 is moved by the ball screw 220 in the Z-axis direction under the guidance of the guide rails 221, and the laser beam generation unit 60 is moved in the Z-axis direction by the movable plate 223.

The laser beam generation unit 60 includes a casing 600 fixed to the movable plate 223. The casing 600 projects horizontally in the Y-axis direction from the movable plate 223, and an irradiation head 609 and an image pickup unit 50 are provided in a lined up relationship in the X-axis direction at an end portion of the casing 600. The irradiation head 609 emits, for example, two branched laser beams LB1 and LB2 (refer to FIG. 2) toward the −Z direction.

Figure 2:
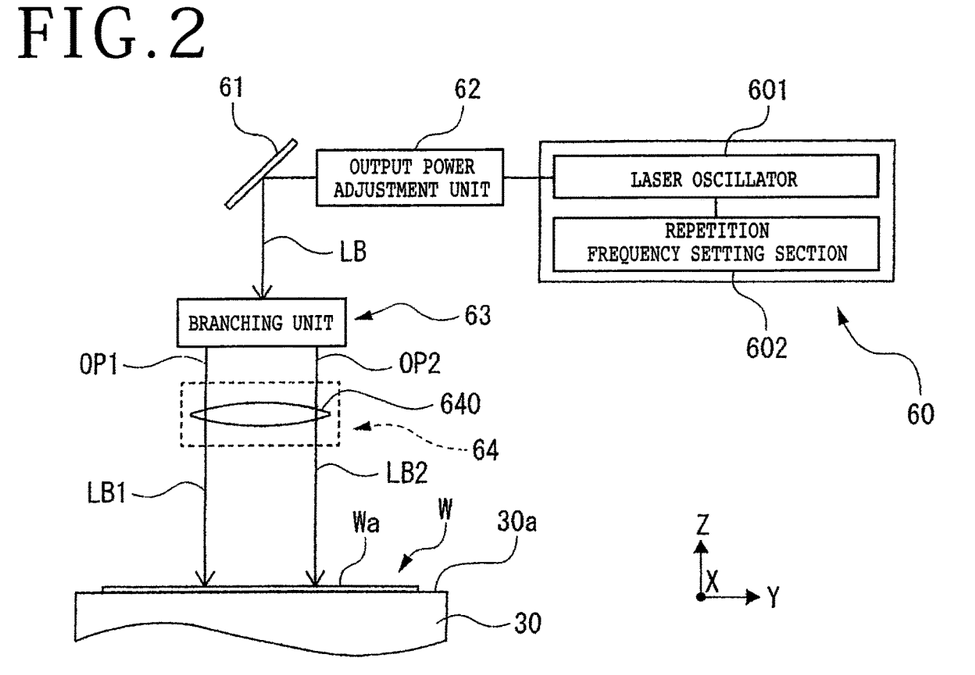
FIG. 2 is a schematic view depicting an example of an optical system of the laser processing apparatus.

The laser beam generation unit 60 includes a laser oscillator 601 such as an yttrium aluminum garnet (YAG) laser depicted in FIG. 2 or the like disposed in the casing 600, and a repetition frequency setting section 602. A laser beam LB emitted horizontally from the laser oscillator 601 is a linearly polarized laser beam and is reflected downwardly in the vertical direction by a mirror 61. An output power adjustment unit 62 for adjusting the output power of the laser beam LB to be irradiated upon the workpiece W is provided between the laser oscillator 601 and the mirror 61.

A branching unit 63 and a condenser 64 are provided between the mirror 61 and the holding table 30. The laser beam LB reflected by the mirror 61 is introduced to the branching unit 63. The branching unit 63 branches the laser beam LB introduced thereto into a laser beam LB1 of a first optical path OP1 and a laser beam LB2 of a second optical path OP2. The condenser 64 includes a condenser lens 640 and condenses the laser beams LB1 and LB2 branched by the branching unit 63 to a processing face Wa of the workpiece W. The mirror 61, branching unit 63 and condenser 64 are disposed in the irradiation head 609 depicted in FIG. 1.

Figure 3:
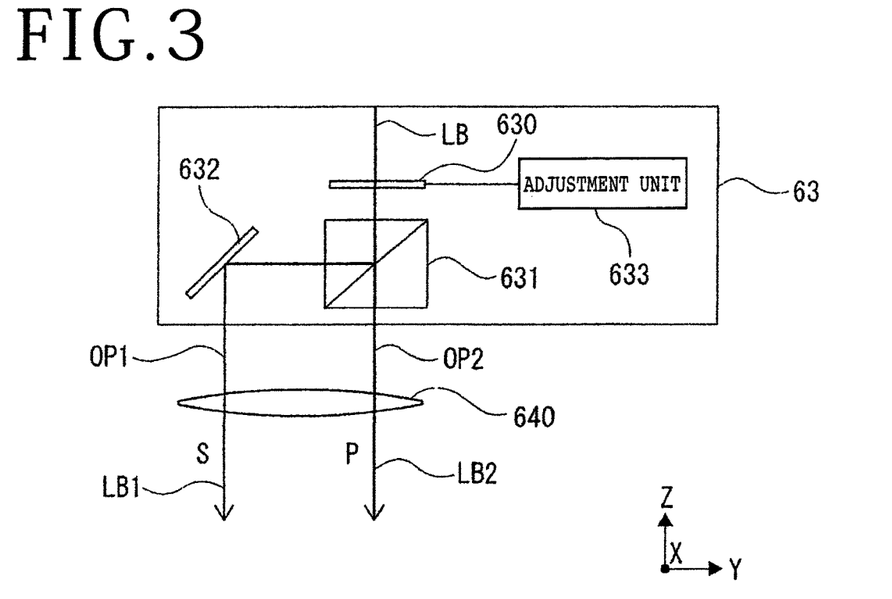
FIG. 3 is a block diagram depicting an example of a branching unit.

As depicted in FIG. 3, the branching unit 63 includes a half-wave plate 630, a polarizing beam splitter 631, a mirror 632 and an adjustment unit 633. The half-wave plate 630 provides a phase difference by one half wavelength to the laser beam LB introduced thereto. The polarizing beam splitter 631 branches the laser beam LB having passed through the half-wave plate 630 into two laser beams LB1 and LB2 having polarization planes S and P orthogonal to each other. The laser beam LB1 of S polarization is reflected by the polarizing beam splitter 631 and branched to the first optical path OP1. Further, the laser beam LB1 is reflected downwardly in the vertical direction by the mirror 632, passes through the condenser lens 640 and is irradiated upon the processing face Wa of the workpiece W. Meanwhile, the laser beam LB2 of P polarization passes through the polarizing beam splitter 631 and is branched to the second optical path OP2. Then, the laser beam LB2 passes through the condenser lens 640 and is irradiated upon the processing face Wa of the workpiece W.

The adjustment unit 633 includes a motor for changing the rotational angle of the half-wave plate 630 and can adjust, by driving the motor, the rotational angle of the half-wave plate 630 to rotate the polarization plane of the emitted light of the half-wave plate 630. Then, by rotating the polarization plane of the emitted light of the half-wave plate 630, the intensity ratio between the laser beam LB1 of S polarization and the laser beam LB2 of P polarization to be outputted from the polarizing beam splitter 631 can be changed continuously. In particular, the branching unit 63 can adjust the output power balance between the two branched laser beams LB1 and LB2 by adjusting the rotational angle of the half-wave plate 630 using the adjustment unit 633.

The image pickup unit 50 depicted in FIG. 1 is disposed at a front end portion of the casing 600 in a predetermined positional relationship with respect to the irradiation head 609 and serves as means for picking up an image of the workpiece W in order to detect a processing region for performing laser processing of the workpiece W held on the holding table 30 and also as means for picking up an image of a blocking member 70 depicted in FIG. 1. The image pickup unit 50 includes a camera including an image pickup element (for example, a charge coupled device (CCD)) having a plurality of pixels arrayed two-dimensionally and an image pickup optical system for introducing the image pickup object image to a light reception face of the image pickup element through the condenser lens 640 depicted in FIG. 2, and a microscope for expanding the image pickup object image picked up by the camera. Further, the image pickup unit 50 includes an automatic focusing function for automatically focusing the camera to an image pickup object by the microscope. It is to be noted that the camera of the image pickup unit 50 may be built in the irradiation head 609 and besides the optical axis of the microscope may be coaxial with the optical axis of the condenser 64.

As depicted in FIG. 1, the laser processing apparatus 1 includes Y-axis direction position measurement means 23 for measuring the position of the holding table 30 in the Y-axis direction. The Y-axis direction position measurement means 23 includes a scale 230 extending in the Y-axis direction along the guide rails 201, and a reading unit not depicted that is fixed to the movable plate 203 such that it moves together with the movable plate 203 along the scale 230 and reads graduations of the scale 230. The reading unit is, for example, of the optical type that reads reflected light from the graduations formed on the scale 230, and detects the graduations of the scale 230 and outputs a pulse signal to a control unit 9.

Further, the laser processing apparatus 1 includes X-axis direction position measurement means 24 configured from a scale 240, a reading unit not depicted and so forth for measuring the position of the holding table 30 in the X-axis direction.

The control unit 9 is configured from a central processing unit (CPU) and a storage element such as a memory, and counts, for example, a pulse signal sent out from the Y-axis direction position measurement means 23 to detect the position of the holding table 30 in the Y-axis direction and controls the Y-axis moving unit 20. The control unit 9 further counts a pulse signal sent out from the X-axis direction position measurement means 24 to detect the position of the holding table 30 in the X-axis direction and controls the X-axis moving unit 21.

It is to be noted that, in the present embodiment, for example, the pulse motor 202 of the Y-axis moving unit 20 is a pulse motor that operates with a driving pulse supplied from a pulse oscillator not depicted. Therefore, also it is possible for the control unit 9 to detect the position of the holding table 30 in the Y-axis direction by counting the number of driving pulses supplied to the Y-axis moving unit 20. Further, for example, the control unit 9 performs control of the laser beam generation unit 60. An example of the control by the control unit 9 is ON/OFF control of a Q switch in the inside of the laser oscillator 601.

The movable plate 203 includes an output power measuring unit 80 that measures the output power of the laser beams LB1 and LB2 emitted from the laser beam generation unit 60 depicted in FIG. 2 and passing through the condenser 64. The output power measuring unit 80 is fixed to a central portion in the X-axis direction of a side face of the movable plate 203 on the column 10A side such that an irradiated portion 800 thereof that is made of a predetermined metal is exposed upwardly. The output power measuring unit 80 is a thermal sensor that converts heat generated by irradiation of the laser beams LB1 and LB2 upon the irradiated portion 800 into voltages to measure the output power of the irradiated laser beams LB1 and LB2.

As depicted in FIG. 1, the blocking member 70 is disposed on the movable plate 213. The blocking member 70 is provided at one end portion in the X-axis direction of a side portion of the movable plate 213 on the column 10A side. The blocking member 70 is a member for blocking only the laser beam LB1 of the first optical path OP1 when the output power of the laser beams LB1 and LB2 emitted from the irradiation head 609 is measured using the output power measuring unit 80. For example, the blocking member 70 is positioned to a first laser beam blocking position at which it blocks only the laser beam LB1 by moving, in a state in which the Y-axis moving unit 20 stops the movable plate 203 at a predetermined position in the Y-axis direction at which both of the laser beams LB1 and LB2 are irradiated upon the output power measuring unit 80, the movable plate 213 in the X-axis direction by the X-axis moving unit 21 and a retracted position at which it blocks none of the laser beams LB1 and LB2. In other words, the X-axis moving unit 21 functions also as blocking member positioning means.

Alternatively, the blocking member positioning means may be configured such that movement of the movable plate 213 by the X-axis moving unit 21 and movement of the movable plate 203 by the Y-axis moving unit 20 are performed simultaneously under the control by the control unit 9 to position the blocking member 70 at the first laser beam blocking position at which the blocking member 70 blocks only the laser beam LB1 and the retracted position at which the blocking member 70 blocks none of the laser beams LB1 and LB2. In other words, in the present embodiment, the blocking member positioning means is configured from the X-axis moving unit 21 and the Y-axis moving unit 20.

Figure 4:
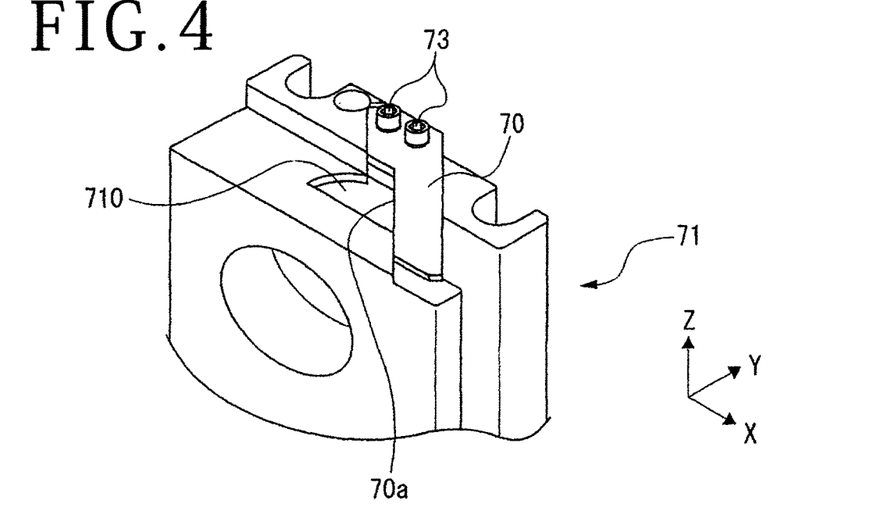
FIG. 4 is a perspective view depicting an example of a blocking member and a mounting portion.

The blocking member 70 is mounted for replacement on a mounting unit 71 formed integrally with the movable plate 213. The mounting unit 71 projects upwardly from a side portion of the movable plate 213. As depicted in FIG. 4, a cutout portion 710 is formed on the mounting unit 71 such that it extends in the X-axis direction to the substantially center of the mounting unit 71. The cutout portion 710 is formed at an intermediate position of the mounting unit 71 in the Y-axis direction such that it extends through the mounting unit 71 in the Z-axis direction.

The blocking member 70 is a member in the form of a plate formed from ceramics that is less likely to be processed by a laser beam LB of a predetermined wavelength (for example, 355 nm). The blocking member 70 is fixedly screwed to an upper face of the mounting unit 71 by screws 73 such that an edge 70a thereof crosses obliquely in the proximity of and above the cutout portion 710. For example, the angle defined by the edge 70a of the blocking member 70 and the Y axis is approximately 45 degrees. Since the edge 70a of the blocking member 70 is not chamfered and therefore is angled, when the blocking member 70 is viewed from above, the boundary of the edge 70a can be distinguished readily. It is to be noted that the shape of the blocking member 70 is not limited to the example depicted in FIG. 4.

Output power checking operation (output power checking method) by the laser processing apparatus 1 configured in such a manner as described above is described in the followings.

(1) Total Output Power Measurement Step

The Y-axis moving unit 20 depicted in FIG. 1 moves the movable plate 203 in the Y-axis direction and the X-axis moving unit 21 moves the movable plate 213 in the X-axis direction to position the blocking member 70 such that the edge 70a thereof is partly included in the image pickup region of the image pickup unit 50. The Z-axis moving unit 22 gradually moves the movable plate 223 in the Z-axis direction to move the image pickup unit 50 by a predetermined distance at a time toward (or away from) the upper face of the blocking member 70 while the image pickup unit 50 operates to successively perform image pickup by the camera at a plurality of height positions, and the camera of the image pickup unit 50 is automatically focused to the height position of the upper face of the blocking member 70 on the basis of a result of image processing of the picked up images. Then, the Z-axis moving unit 22 stops the movement of the movable plate 223 at a point of time at which the camera of the image pickup unit 50 is focused just to the upper face of the blocking member 70.

Figure 5:
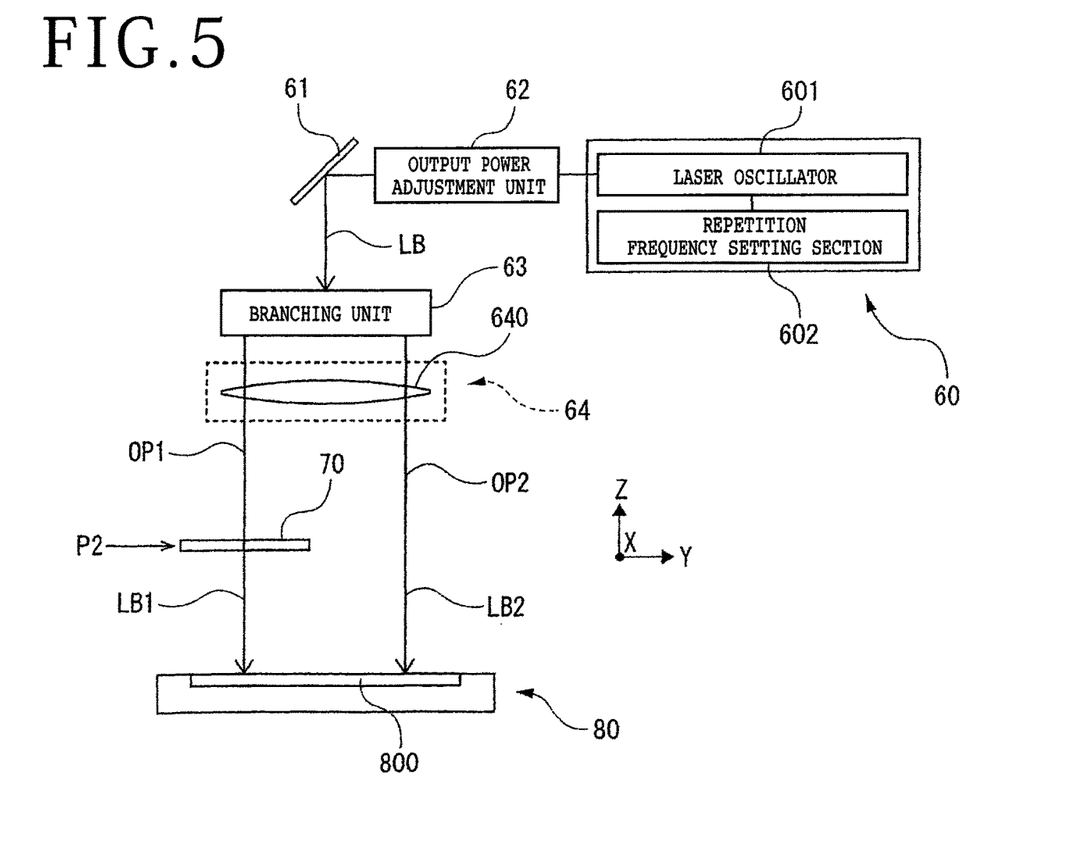
FIG. 5 is a schematic view of the optical system when the blocking member is in a retracted position.

Further, in the laser processing apparatus 1, a program for adjusting the height position of the focusing point of the condenser lens 640 of the condenser 64 depicted in FIG. 5 in an interlocking relationship with such an automatic focusing operation of the image pickup unit 50 as just described is incorporated. Thus, at a point of time at which the camera of the image pickup unit 50 is focused just to the upper face of the blocking member 70, the condenser lens 640 is placed into a state in which the height position of the focusing point thereof is aligned with the height position of the upper face of the blocking member 70.

Figure 6:
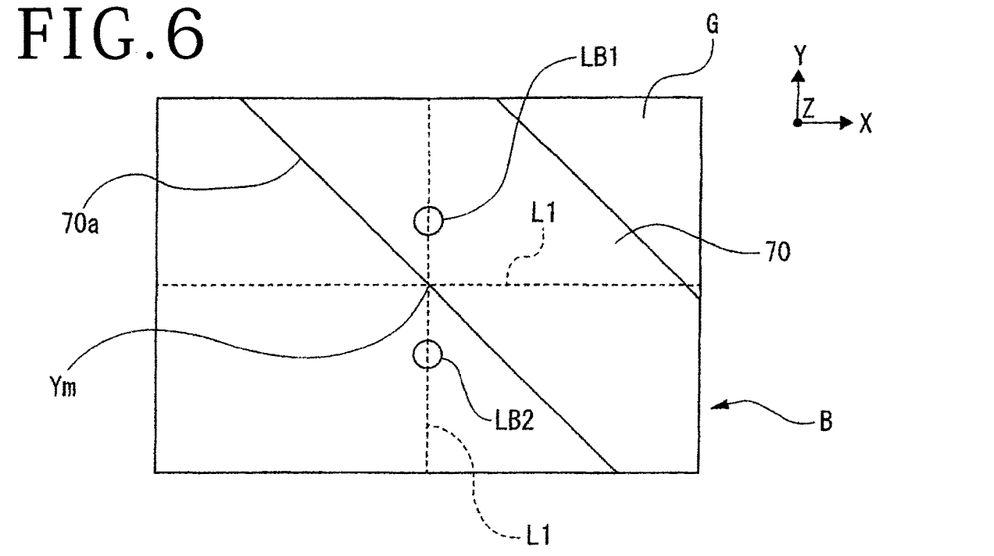
FIG. 6 is an explanatory view illustrating a state in which an edge of the blocking member depicted in a picked up image is positioned at the center between branched laser beams.

A picked up image G on which the edge 70a of the blocking member 70 is reflected is formed in the state in which the camera of the image pickup unit 50 is focused just to the upper face of the blocking member 70, and the formed picked up image G on which part of the blocking member 70 is reflected is displayed on a monitor screen B of a predetermined resolution depicted in FIG. 6. Broken lines depicted on the monitor screen B depict reference lines L1 (in the present embodiment, they are also center lines of the condenser lens 640) of the camera of the image pickup unit 50, and a point of intersection between the reference lines L1 is set so as to be always displayed at the center position of the monitor screen B. Further, two circles in the picked up image G indicate virtual laser beams LB1 and LB2 after branched. For example, the coordinate position ym of the center (middle point) between the laser beams LB1 and LB2 in the Y-axis direction is associated with the reference lines L1 such that it becomes the center position of the monitor screen B.

The positional relationship between the blocking member 70 and the virtual laser beams LB1 and LB2 after the branching is grasped from the picked up image G, and the Y-axis moving unit 20 depicted in FIG. 1 moves the movable plate 203 in the Y-axis direction under the control by the control unit 9 to position the output power measuring unit 80 such that the irradiated portion 800 is positioned just below the irradiation head 609, and the X-axis moving unit 21 moves the movable plate 213 in the X-axis direction to position the blocking member 70 at the retracted position P2 (refer to FIG. 5) at which the blocking member 70 blocks none of the laser beam LB1 of the first optical path OP1 and the laser beam LB2 of the second optical path OP2 emitted from the irradiation head 609 toward the output power measuring unit 80. Thereafter, the laser beam generation unit 60 is rendered operative, namely, the laser oscillator 601 is caused to oscillate a laser beam LB while the output power of the laser beam LB is adjusted by the output power adjustment unit 62, and the branched laser beams LB1 and LB2 of the first optical path OP1 and the second optical path OP2 are irradiated from the condenser 64 upon the output power measuring unit 80 to measure the total output power of the laser beams LB1 and LB2. Then, the total output power measured by the output power measuring unit 80 is recorded.

It is to be noted that, since a thermal sensor having a characteristic that the range of the measurement power is wide is used as the output power measuring unit 80, also in the case where the height position of the focusing point of the condenser lens 640 is adjusted not to the irradiated portion 800 of the output power measuring unit 80 but to the upper face of the blocking member 70, the total output power of the laser beams LB1 and LB2 can be measured accurately. Further, also at a non-blocked laser beam output power measurement step hereinafter described, similarly the output power of the laser beam LB2 of the second optical path OP2 can be measured accurately, and therefore, a measurement miss does not occur.

(2) Blocking Step

Thereafter, a blocking step of blocking only the laser beam LB1 of the first optical path OP1 emitted from the laser beam generation unit 60 and condensed by the condenser 64 using the blocking member 70 is carried out. For example, a worker would view the picked up image G on the monitor screen B to grasp the position of the edge 70a in the proximity of the center of the blocking member 70 and designate a predetermined position of the edge 70a of the blocking member 70 to the control unit 9 such that the edge 70a of the blocking member 70 and the center position of the monitor screen B (point of intersection of the reference lines L1) in the picked up image G overlap with each other. Here, since the blocking member 70 that is angled at the edge 70a thereof is used, the part of the edge 70a of the blocking member 70 in the picked up image G formed by the image pickup unit 50 can be made clear. Consequently, grasping of the position of the edge 70a and position designation to the control unit 9 by the worker can be performed readily and accurately.

For example, if the designation by the worker is inputted to the control unit 9 from a touch panel provided on the monitor screen B, a keyboard provided in the apparatus or the like, then the control unit 9 controls, on the basis of the designation, the Y-axis moving unit 20 depicted in FIG. 1 to move the movable plate 203 in the Y-axis direction and controls the X-axis moving unit 21 to move the movable plate 213 in the X-axis direction while a state in which the irradiated portion 800 of the output power measuring unit 80 is positioned just below the irradiation head 609 is kept to adjust the edge 70a of the blocking member 70 to the coordinate position ym at the center (middle point) between the virtual laser beams LB1 and LB2 after the branching as depicted in FIG. 6. In particular, as depicted in FIG. 7, a state is established in which the blocking member 70 is positioned at the first laser beam blocking position P1 at which only the laser beam LB1 of the first optical path OP1 from between the laser beams LB branched by the branching unit 63 is blocked.

(3) Non-Blocked Laser Beam Output Power Measurement Step

Figure 7:
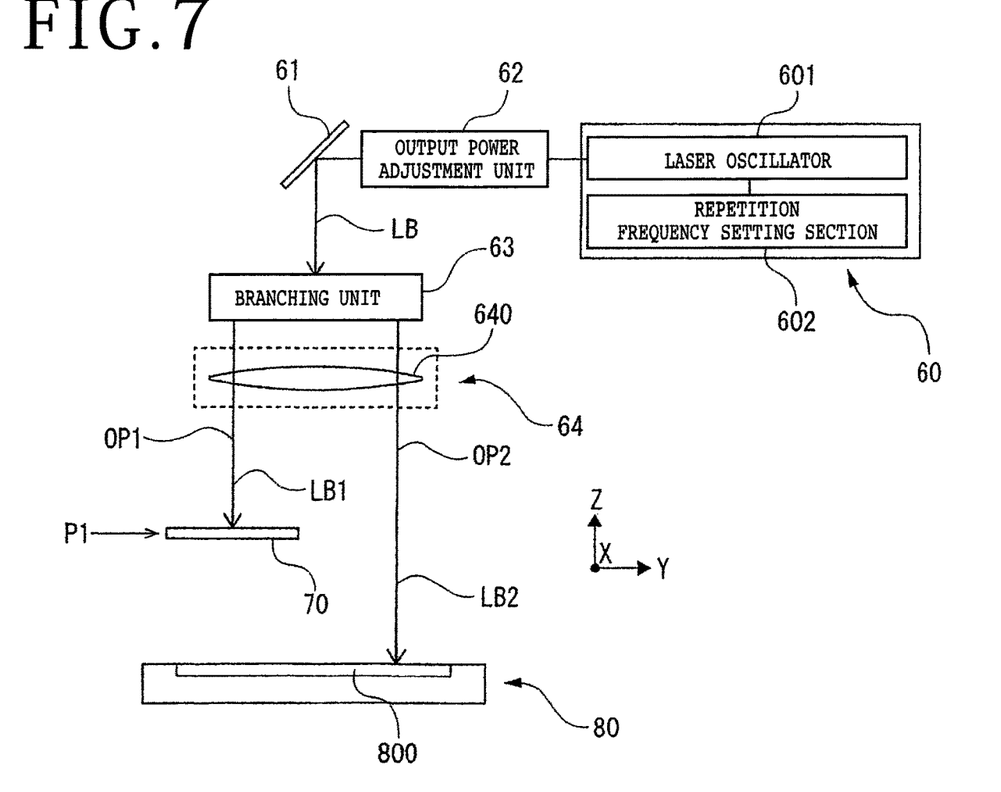
FIG. 7 is a schematic view of the optical system when the blocking member is at a first laser beam blocking position.

In the state in which the blocking step is carried out, a laser beam LB is oscillated from the laser oscillator 601 depicted in FIG. 7 and the output power of the laser beam LB is adjusted by the output power adjustment unit 62, and the laser beam LB2 of the second optical path OP2 branched by the branching unit 63 but not blocked by the blocking member 70 is emitted from the condenser 64 and passes the cutout portion 710 (refer to FIG. 4) of the mounting unit 71 so as to be irradiated upon the output power measuring unit 80 to measure the output power of the laser beam LB2 of the second optical path OP2.

(4) Laser Beam Output Power Calculation Step

Then, on the basis of the value measured at the total output power measurement step (total output power of the laser beams LB1 and LB2) and the value measured at the non-blocked laser beam output power measurement step (output power of the laser beam LB2 of the second optical path OP2), an output power value (first output power) of the laser beam LB1 branched to the first optical path OP1 and an output power value (second output power) of the laser beam LB2 branched to the second optical path OP2 are calculated. In particular, a value when the value measured at the non-blocked laser beam output power measurement step is subtracted from the value measured at the total output power measurement step is calculated as the output power value of the laser beam LB1 branched to the first optical path OP1.

Originally, in the laser processing apparatus 1, the output power balance between the two laser beams LB1 and LB2 branched from the laser beam LB should become a desired balance by rotational angle adjustment of the half-wave plate 630 by the adjustment unit 633 depicted in FIG. 3. However, for example, degradation of a motor of the adjustment unit 633 or the like may give rise to a case in which the output power balance between the two laser beams LB1 and LB2 branched from the laser beam LB are displaced from a desired balance. However, as described above, according to the laser processing apparatus 1 of the present embodiment, since, by positioning the blocking member 70 at the retracted position P2 at which none of the laser beams LB1 and LB2 are blocked, all of the laser beams LB1 and LB2 can be irradiated upon the output power measuring unit 80 to measure the output power of all of the laser beams LB1 and LB2, and by positioning the blocking member 70 at the first laser beam blocking position P1 at which only the laser beam LB1 of the first optical path OP1 from between the laser beams LB1 and LB2 branched to the first optical path OP1 and the second optical path OP2 is blocked, the laser beam LB2 of the second optical path OP2 can be irradiated upon the output power measuring unit 80 to measure the output power of the laser beam LB2 of the second optical path OP2, the output power balance between the laser beams LB1 and LB2 branched to the first optical path OP1 and the second optical path OP2 can be checked on the basis of the measurement values of the output power.

Further, by configuring the control unit 9 of the laser processing apparatus 1 such that it controls the blocking member positioning means on the basis of the position of the blocking member 70 detected on the basis of the picked up image G of the blocking member 70 picked up by the image pickup unit 50, it is possible to position the blocking member 70 in a shorter period of time to the first laser beam blocking position P1 at which only the laser beam LB1 of the first optical path OP1 is blocked.

Further, with the output power checking method of the present embodiment, by measuring, at the total output power measurement step, the total output power of the laser beams LB1 and LB2 branched to the first optical path OP1 and the second optical path OP2 and measuring, at the non-blocked laser beam output power measurement step, the output power of the laser beam LB2 that is not blocked by the blocking member 70 in the state in which only the laser beam LB1 of the first optical path OP1 is blocked by the blocking member 70 and then calculating, at the laser beam output power calculation step, the output power of the laser beam LB1 branched to the first optical path OP1 and the output power of the laser beam LB2 branched to the second optical path OP2 on the basis of a value measured at the total output power measurement step and a value measured at the non-blocked laser beam output power measurement step, the output power of the branched laser beams LB1 and LB2 can be checked.

Further, in the present embodiment, since the blocking member 70 angled at the edge 70a thereof is used, the part of the edge 70a of the blocking member 70 in the picked up image G formed by the image pickup unit 50 can be made clear, and the edge 70a of the blocking member 70 can be positioned readily and accurately at the center between the laser beams LB1 and LB2.

It is to be noted that the embodiment of the present invention is not limited to the embodiment described above and the present invention can be changed, replaced or modified in various manners without departing from the scope and the spirit of the technical scope of the present invention.

For example, while, in the embodiment described above, the blocking step and the non-blocked laser beam output power measurement step are carried out after the total output power measurement step, otherwise the total output power measurement step may be carried out after the blocking step and the non-blocked laser beam output power measurement step.

Further, since the blocking member 70 is gradually processed by a laser beam by repeatedly carrying out the output power checking method according to the present invention, the blocking member 70 used by a plural number of times is removed at a fixed timing from the mounting unit 71 and is replaced with a new blocking member 70.

Further, while the output power checking method according to the embodiment described above is configured such that a laser beam LB oscillated from the laser beam generation unit 60 is branched to two optical paths of the first optical path OP1 and the second optical path OP2 by the branching unit 63, also it is possible to configure the output power checking method such that the laser beam LB is branched to three or more optical paths.

It is to be noted that a program may be inputted to the control unit 9 such that, without interposing, at the (2) blocking step, such an operation of a worker that the worker views the picked up image G to grasp a predetermined position of the edge 70a of the blocking member 70 and designates the position of the edge 70a or the like to the control unit 9 as in the embodiment described above, the (2) blocking step is performed automatically by the laser processing apparatus 1. In this case, for example, if a predetermined operation button of the laser processing apparatus 1 is depressed, then image pickup of the blocking member 70 by the image pickup unit 50 is carried out automatically, and then the edge 70a of the blocking member 70 in a picked up image is detected by image processing, whereafter the blocking member 70 is positioned by the blocking member positioning means such that the coordinate position of the detected edge 70a and the coordinate position of the center (middle point) between the laser beams LB1 and LB2 after branched coincide with each other.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A laser processing apparatus, comprising:
   a holding table configured to hold a workpiece thereon;
   a laser beam generation unit configured to generate a laser beam to be irradiated upon the workpiece held on the holding table;
   a branching unit configured to branch the laser beam emitted from the laser beam generation unit into a first laser beam on a first optical path and a second laser beam on a second optical path;
   a condenser configured to condense the laser beams branched by the branching unit on a processing face of the workpiece;
   an output power measuring unit configured to measure output power of the laser beam emitted from the laser beam generation unit and having passed through the condenser; and
   blocking member positioning means disposed between the condenser and the output power measuring unit, said blocking member positioning means including a blocking member and configured to move the blocking member transverse to the first and second optical paths between a first laser beam blocking position at which the blocking member completely blocks only the first laser beam on the first optical path and a retracted position at which the blocking member blocks none of the first and second laser beams;
   the branching unit including an adjustment unit configured to adjust output power balance between the first and second laser beams branched at least to the first optical path and the second optical path.

2. The laser processing apparatus according to claim 1, further comprising:
   an image pickup unit configured to pick up an image of the blocking member; and
   a control unit configured to control at least the laser beam generation unit and the blocking member positioning means, wherein
   the control unit controls the blocking member positioning means based on a position of the blocking member detected based on the picked up image of the blocking member picked up by the image pickup unit.

3. The laser processing apparatus according to claim 2, wherein the image pickup unit picks up an image of the workpiece held on the holding table.

4. An output power checking method for checking, in a laser processing apparatus in which a laser beam emitted from a laser beam generation unit is branched at least to a first laser beam on a first optical path and a second laser beam on a second optical path by a branching unit, and the first and second laser beams are condensed to and irradiated upon a processing face of a workpiece held on a holding table by a condenser, output power of the first and second laser beams, the output power checking method comprising:
   a total output power measurement step of measuring total output power of the first and second laser beams emitted from the laser beam generation unit and condensed by the condenser;
   a blocking step of moving a blocking member transverse to the first and second optical paths and completely blocking at least the first laser beam of the first optical path emitted from the laser beam generation unit and condensed by the condenser using a blocking member;
   a non-blocked laser beam output power measurement step of measuring output power of the first and second laser beams, which are not blocked by the blocking member, in a state in which the blocking step is carried out; and
   a laser beam output power calculation step of calculating, based on the value measured at the total output power measurement step and the value measured at the non-blocked laser beam output power measurement step, first output power of the first laser beam branched to the first optical path and second output power of the second laser beam branched to the second optical path.

5. The laser processing apparatus according to claim 1, wherein the blocking member is mounted on a mounting unit, said mounting unit including a cutout portion.

6. The laser processing apparatus according to claim 5, wherein the blocking member is a plate that is fastened to said mounting unit, said blocking member being made of a ceramic material.

7. The output power checking method according to claim 4, wherein the blocking member is mounted on a mounting unit, said mounting unit including a cutout portion.

8. The output power checking method according to claim 7, wherein the blocking member is a plate that is fastened to said mounting unit, said blocking member being made of a ceramic material.

* * * * *